United States Patent
Georgi

(10) Patent No.: US 7,304,925 B2
(45) Date of Patent: Dec. 4, 2007

(54) WOBBLE DEMODULATION FOR HIGH DENSITY OPTICAL RECORDING MEDIA

(75) Inventor: Marco Georgi, Hannover (DE)

(73) Assignee: Thomson Licensing, Boulogne-Billancourt (FR)

(*) Notice: Subject to any disclaimer, the term of this patent is extended or adjusted under 35 U.S.C. 154(b) by 551 days.

(21) Appl. No.: 10/914,488

(22) Filed: Aug. 9, 2004

(65) Prior Publication Data

US 2005/0047296 A1    Mar. 3, 2005

(51) Int. Cl.
*G11B 7/00* (2006.01)
(52) U.S. Cl. .................................. 369/47.27
(58) Field of Classification Search ............ 369/44.13, 369/275.3, 47.1, 47.27, 47.28
See application file for complete search history.

(56) References Cited

U.S. PATENT DOCUMENTS

| | | | |
|---|---|---|---|
| 6,690,641 B2 * | 2/2004 | Miyamoto et al. ........ | 369/275.4 |
| 6,791,921 B2 * | 9/2004 | Maeda et al. ............ | 369/47.28 |
| 7,193,936 B2 * | 3/2007 | Oki ........................ | 369/44.13 |

FOREIGN PATENT DOCUMENTS

| | | |
|---|---|---|
| EP | 1271489 A2 | 1/2003 |
| EP | 1324320 A1 | 7/2003 |
| WO | 03034414 A1 | 4/2003 |

OTHER PUBLICATIONS

EPO Search Report.

* cited by examiner

*Primary Examiner*—Nabil Hindi
(74) *Attorney, Agent, or Firm*—Joseph J. Laks; Robert D. Shedd; Reitseng Lin

(57) ABSTRACT

The present invention relates to a method for the demodulation of the ADIP data of a wobble signal of an optical recording medium, whereby the wobble signal comprises different types of wobble periods, and to an apparatus for reading from and/or writing to optical recording media using such method. According to the invention, the method comprises the steps of transforming the frequency and/or phase of harmonic deviations within the wobble signal to amplitude deviations, detecting the amplitude deviations, and detecting a current type of wobble period from the detected amplitude deviations.

16 Claims, 5 Drawing Sheets a)

b)

a)

b)

a)

b)

WOBBLE DEMODULATION FOR HIGH DENSITY OPTICAL RECORDING MEDIA

This application claims the benefit, under 35 U.S.C. § 119 of European Patent Application 03019161.3, filed Aug. 25, 2003.

FIELD OF THE INVENTION

The present invention relates to a method for the demodulation of the ADIP data of a wobble signal of an optical recording medium, and to an apparatus for reading from and/or writing to optical recording media using such method.

BACKGROUND OF THE INVENTION

Methods such as these are used, for example, in an apparatus for reading from and/or writing to optical recording media having wobbled tracks, in order to obtain address information from the wobbled tracks (ADIP information, address in pregroove) or to use the wobble frequency to produce a write clock.

In general, in optical recording media, which are in the form of discs and are suitable for reading from and/or writing to, the tracks are formed such that they represent an interleaved spiral or concentric circles. Especially in the case of optical recording media which are suitable for writing to, the tracks additionally are wobbled in a specific form, in order to find specific positions on the medium. This means that the track is not an approximately straight line, but a serpentine line. By way of example, the shape of this serpentine line can contain address information, which is used for identifying a specific position on this optical recording medium. Various methods are used for coding, examples of which include frequency modulation or phase modulation. Furthermore, the wobble signal may also be used for rotation speed information or for presetting a write data rate.

For high density optical recording media, it has been proposed to modulate the wobble signal using two methods in an intermixed manner: Minimum Shift Keying cosine variant (MSK-cos) and Harmonic Modulated Wave (HMW), which is also referred to as sawtooth wobble. Only some of the wobble periods are modulated. Most of the wobble periods are monotone wobbles (MW), as depicted in FIG. 1a). The MSK-cos method is mainly adopted for the ADIP unit synchronization, and is illustrated in FIG. 2a). The MSK mark indicates the start of the ADIP unit or is used for synchronization or data recognition. The HMW method is mainly employed for the ADIP data. The second harmonic of the fundamental wobble frequency is added to the wobble with a lower amplitude level. Its phase is in quadrature with the fundamental wobble frequency and it is bi-phase modulated according to the ADIP bit, which is illustrated in FIGS. 3 and 4.

In the wobble signal of the proposed high density optical recording medium the following frequencies with different phases occur.

$f1(t) = \cos(2\pi \cdot f_{wob} \cdot t)$ $f2(t) = -\cos(2\pi \cdot f_{wob} \cdot t) = -f1(t)$ $f3(t) = \cos(2\pi \cdot 1.5 \cdot f_{wob} \cdot t)$ $f4(t) = -\cos(2\pi \cdot 1.5 \cdot f_{wob} \cdot t) = -f3(t)$ $f5(t) = \cos(2\pi f_{wob} \cdot t) + \frac{1}{4} \cdot \sin(2\pi \cdot 2 \cdot f_{wob}) \cdot t)$ $f6(t) = \cos(2\pi f_{wob} \cdot t) - \frac{1}{4} \cdot \sin(2\pi 2 \cdot f_{wob}) \cdot t)$ As can be seen from the above list, depending on the frequency and the phase of the wobble signal different types of wobble periods are found in the wobble signal.

Since the above described modulation of the wobble signal is quite new, solutions for a reliable wobble demodulation are hardly known. Typical schemes known from prior art for frequency or phase demodulation could be used, but it is difficult to apply the proper combination of both schemes.

Minamino et al. in Jpn. J. Appl. Phys Vol. 41 (2002), pp 1741-1742, propose a new concept of addressing in optical disks using a sawtooth wobble groove. For calculating the error rate of every sawtooth wobble the steep edges of the sawtooth shape are converted to pulse signals by differential calculus.

Kobayashi et al. in Jpn. J. Appl. Phys Vol. 42 (2003), pp 915-918, propose a method for detecting the MSK marks and the HMW sawtooth wobble. A heterodyne circuit consisting of a carrier multiplier, an integrator and a sample and hold element is used for this purpose. The wobble signal is multiplied by the cosine carrier of the fundamental frequency for detecting the MSK marks in the multiplier. On the other hand it is multiplied by the sine carrier of the second harmonic frequency for detecting the HMW sawtooth wobble.

It is an object of the invention to propose an alternative method for a reliable wobble demodulation.

SUMMARY OF THE INVENTION

According to the invention, a method for the demodulation of the ADIP data of a wobble signal of an optical recording medium, whereby the wobble signal comprises different types of wobble periods, comprises the steps of transforming the frequency and/or phase of harmonic deviations within the wobble signal to amplitude deviations, detecting the amplitude deviations, and detecting a current type of wobble period from the detected amplitude deviations.

Frequency and/or phase of harmonic deviations are transformed into amplitude deviations, which can easily be detected. The invention is especially advantageous for f5(t) and f6(t), which are bit representations of data 1 and data 0, respectively, since in the case of HMW modulation the addition/subtraction of the harmonic wave does not lead to a change in the period of the fundamental wobble frequency. Typical wobble demodulators are, therefore, not able to detect f5(t) or f6(7). The invention has the advantage of low implementation costs and the simple algorithm used for demodulation, which results in a low implementation time. Though the performance is not comparable to the performance of coherence based demodulation algorithms, the performance is sufficient for low-cost applications.

Since the method transforms frequency deviations in amplitude deviations, the method is susceptible to amplitude disturbance from the recording medium, e.g. fingerprints. However, these amplitude disturbance can be reduced using an automatic-gain-control (AGC).

Favorably, information about the currently used modulation is obtained from the detected types of wobble period. The types of wobble period f1(t), . . . f6(t) give information about the currently used modulation:

MSK (minimum shift keying)

MW (monotone wobble)

Sawtooth wobble representing a data '1' (HMW=harmonic modulated wave)

Sawtooth wobble representing a data '0' (HMW=harmonic modulated wave)

cannot detect (error)

With this information the type of the ADIP unit and the ADIP word structure are detected and the ADIP codeword is extracted.

Advantageously, the step of transforming the frequency and/or phase of harmonic deviations within the wobble signal to amplitude deviations comprises integrating the wobble signal using a dynamic integrate function, i.e. the integral function of the signal. This allows a very simple and efficient transformation of the frequency deviations into amplitude deviations. Other methods for transforming the frequency and/or phase of harmonic deviations within the wobble signal to amplitude deviations, such as calculating the derivative, can also be used. In general only the frequency deviations can be transformed into amplitude deviations, not the phase deviations. However, in this special case, different values are obtained depending on whether the harmonic is added or subtracted, respectively. This allows to transform also the phase deviations into amplitude deviations.

Favorably, the method further comprises the steps of storing the maximum and/or minimum values of the integral of the wobble within a wobble period, and using the stored maximum and/or minimum values as an indication of the type of wobble period.

Successive maximum and/or minimum values (only maximum or minimum or a combination of both) are a direct indication of the type of wobble period. After one wobble period the maximum and/or minimum values are favorably cleared, e.g. at zero-crossings of the integral function or at a maximum of the wobble input signal.

According to the invention, the maximum and/or minimum values are compared with value ranges for the different types of wobble periods. Though in theory specific amplitudes correspond to the maximum and minimum of a specific type of wobble period, in practice the signal comprises noise components and these values are not reached exactly. Therefore, value ranges are advantageously defined. If the value ranges are wide a detection of unknown values is prevented, however, values might be incorrectly detected. If the value ranges are small, the detection is less likely to be incorrect, however, unknown values will produce errors. In a preferred embodiment a value range without interruptions is used. Though this might lead to occasional errors, these will usually not affect the ADIP demodulation by a statemachine due to its error tolerance.

Favorably, at least one of the different types of wobble period is detected by measuring the frequency of the wobble signal. For example, f3(t) and f4(t) can be distinguished from f1(t), f2(t), f5(t) and f6(t) by a simple frequency detection, e.g. by measuring the time for one period or by counting samples between (e.g. positive) zero crossings. Distinguishing f1(t), f2(t), f5(t) and f6(t) in this way is not possible, since all functions have the same period length.

Advantageously, the order of maximum and minimum value in one period is determined for detecting the type of wobble period. For example, the phase of f1(t) and f3(t) cannot be detected by analyzing the maximum/minimum value of the integral of the wobble, because the 180 degree phase shift results in the same maximum/minimum values.

To obtain the phase it is checked whether the maximum occurs before the minimum or the minimum occurs before the maximum within one wobble period. The phase is not mandatory needed, but it increase the performance.

Favorably, the method is applied to a wobble signal which is modulated using the methods of minimum shift keying (MSK) and/or harmonic modulated wave (HMW). Since such a wobble modulation has been proposed for high density optical recording media, a method capable of demodulating this type of wobble signal will become important.

Advantageously, a device for demodulating the ADIP data of a wobble signal of an optical recording medium, whereby the wobble signal comprises different types of wobble periods, performs a method according to the invention.

Favorably, a method according to the invention is performed by an apparatus for reading from and/or writing to optical recording media for wobble demodulation. Such an apparatus has a sufficiently reliable wobble demodulation at reduced implementation cost.

BRIEF DESCRIPTION OF THE DRAWINGS

For a better understanding of the invention, an exemplary embodiment is specified in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

In the FIGS. 1 to 4 instead of the functions fi(t) the sampled functions $fi_n$ are shown. The functions were sampled at 66 MHz with a quantisation of 100, i.e. the theoretical value range of the input signal is multiplied by 100 and distributed evenly over the available sampling values.

Figure 1:
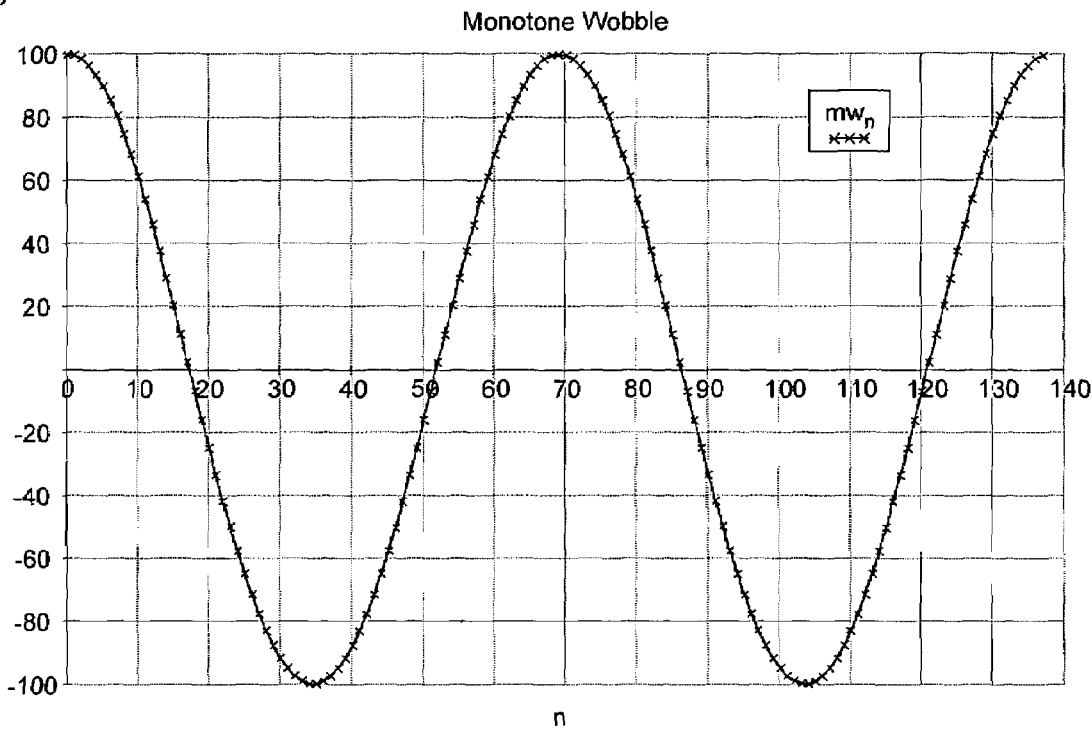
FIG. 1 shows in part a) a monotone wobble in a wobble signal and in part b) an integrated monotone wobble.
Figure 1:
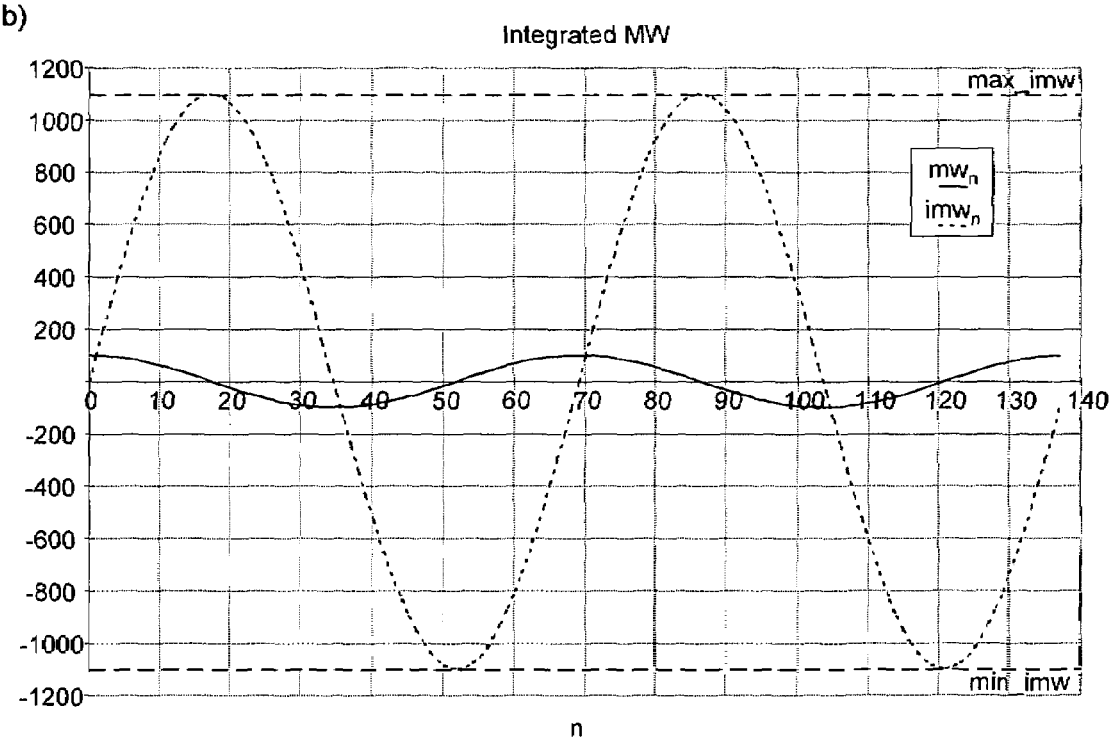

In part a) of FIG. 1 a monotone wobble $mw_n$ in a wobble signal is shown. Part b) of the figure shows an integrated monotone wobble $imw_n$ in comparison to the monotone wobble $mw_n$ together with the corresponding maximum value max_imw and minimum value min_imw.

Figure 2:
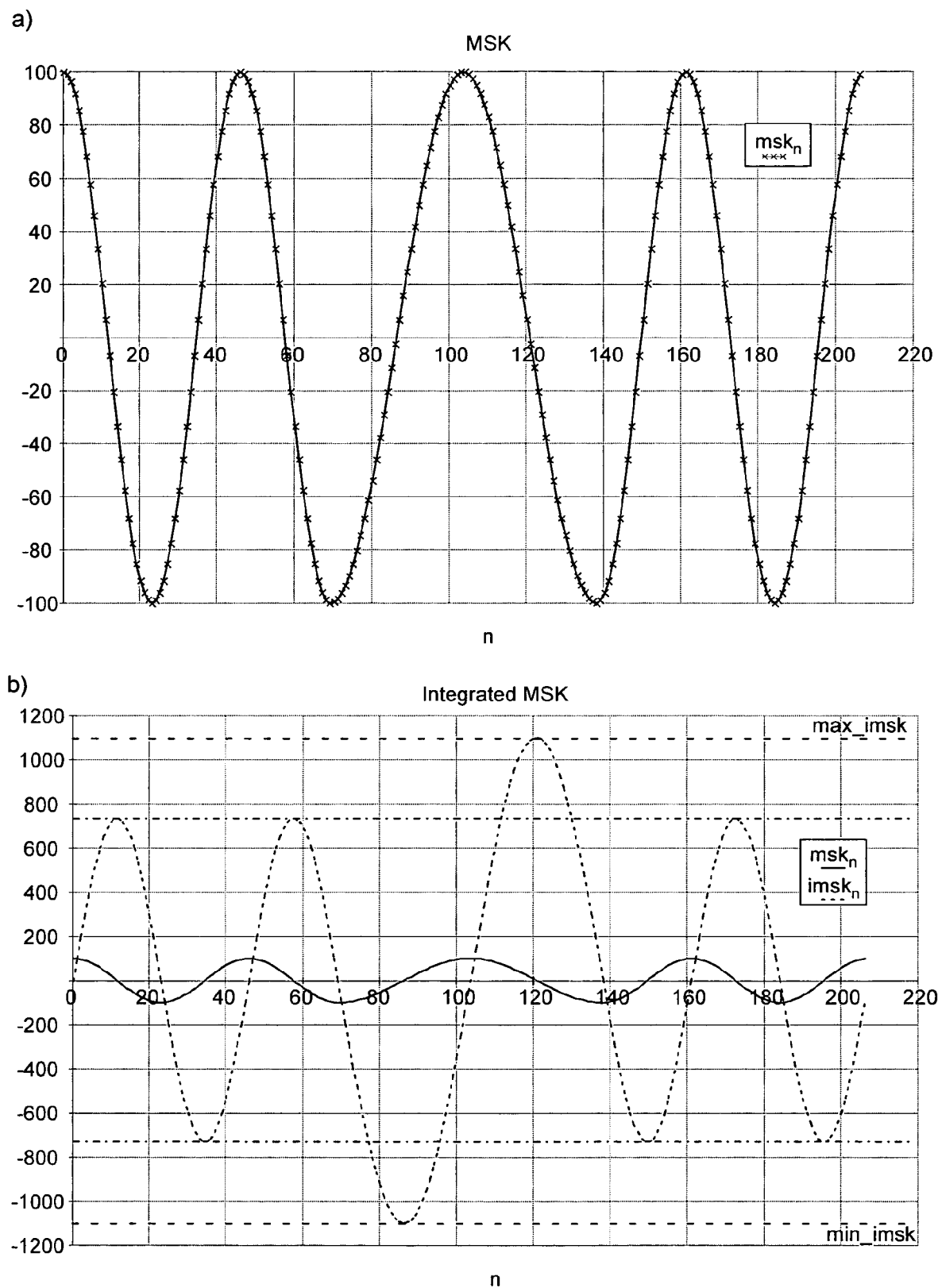
FIG. 2 shows in part a) an MSK mark in a wobble signal and in part b) an integrated MSK mark.
Figure 3:
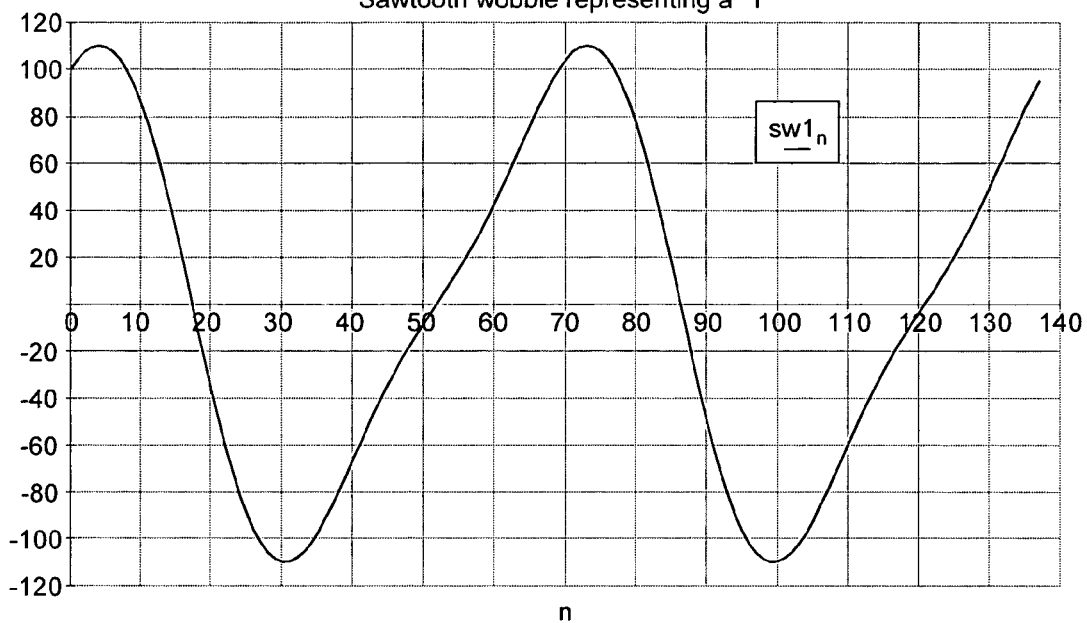
FIG. 3 shows in part a) a sawtooth wobble representing a "1" and in part b) the corresponding integrated sawtooth wobble.
Figure 3:
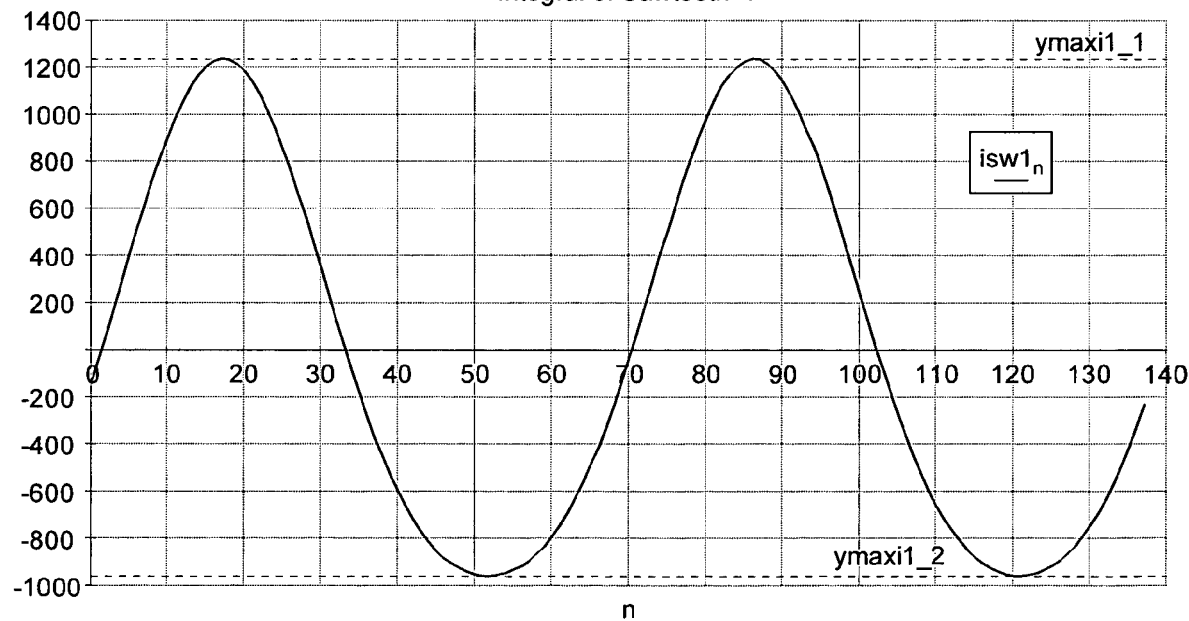
Figure 4:
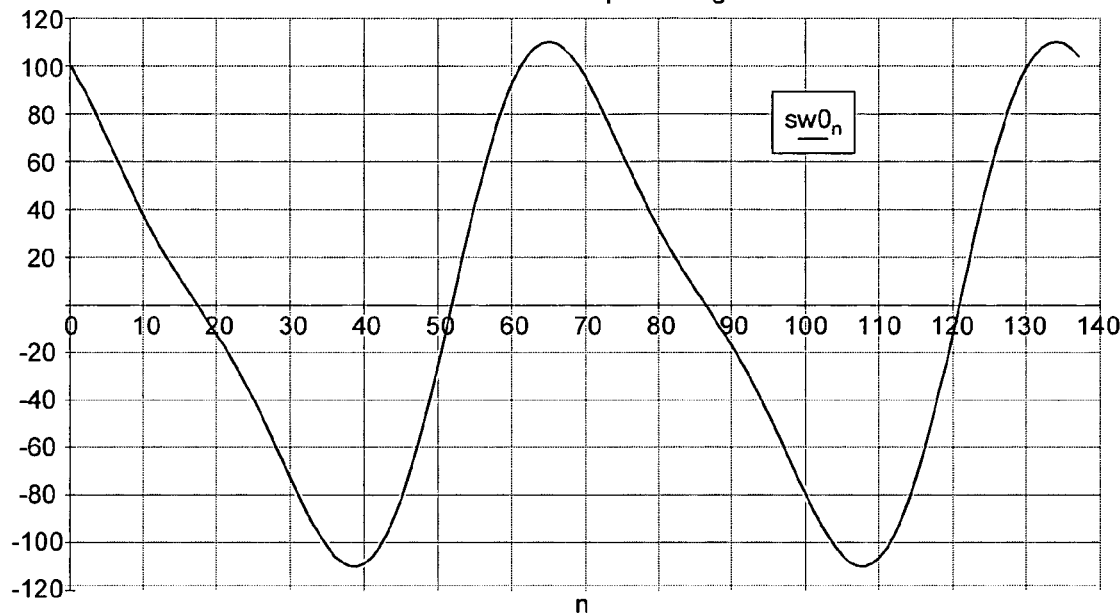
FIG. 4 shows in part a) a sawtooth wobble representing a "0" and in part b) the corresponding integrated sawtooth wobble.
Figure 4:
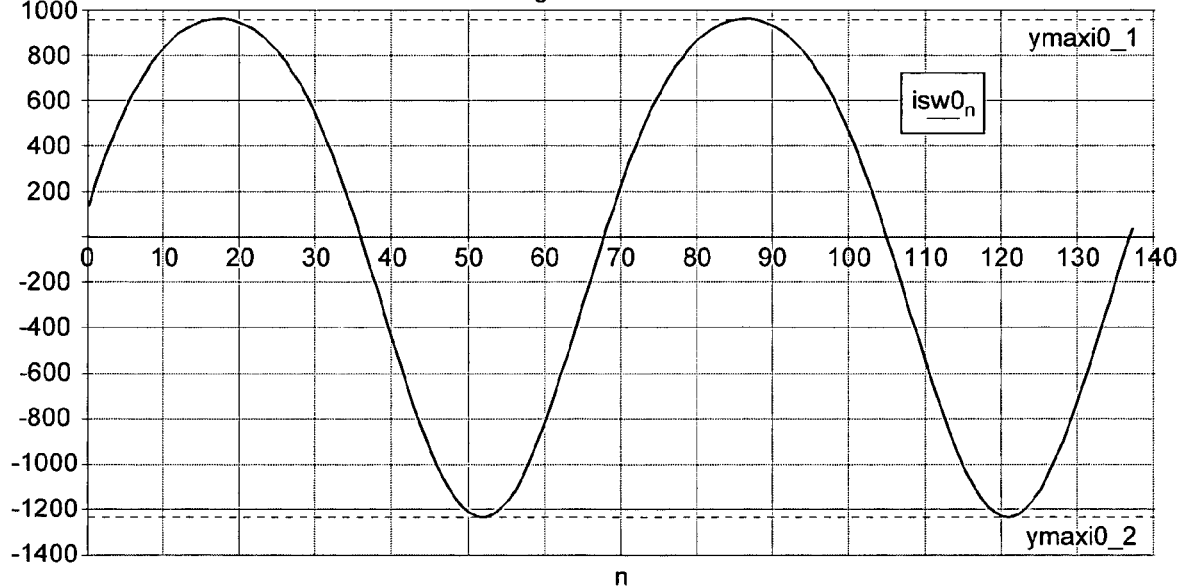

FIG. 2 shows in part a) an MSK mark $msk_n$ in a wobble signal and in part b) an integrated MSK mark $imsk_n$ in comparison to the MSK mark $msk_n$ together with the corresponding maximum value max_imsk and minimum value min_imsk.

A sawtooth wobble $sw1_n$ representing a "1" is shown in FIG. 3a). The corresponding integrated sawtooth wobble $isw1_n$ together with the respective maximum value ymaxi1_1 and minimum value ymaxi1_2 is depicted in FIG. 3b).

Similarly, a sawtooth wobble $sw0_n$ representing a "0" is shown in FIG. 4a). The corresponding integrated sawtooth wobble $isw0_n$ together with the respective maximum value ymaxi0_1 and minimum value ymaxi0_2 is depicted in FIG. 4b).

Figure 5:
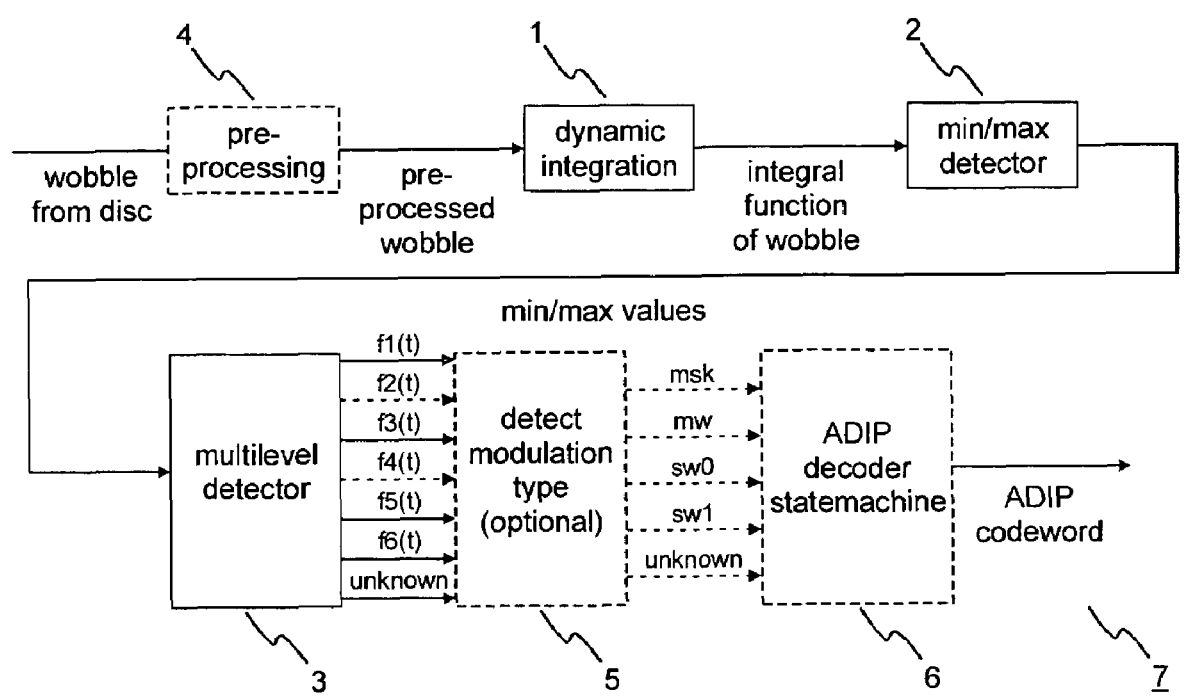
FIG. 5 shows a wobble demodulator according to the invention.

A wobble demodulator 7 according to the invention is depicted in FIG. 5. It mainly consists of a pre-processing block 4, an integrator 1, a minimum/maximum detector 2, a multilevel detector 3, a modulation type detector 5, and an ADIP decoder statemachine 6. The pre-processing block 4 and the modulation type detector 5 are not mandatory. The demodulator 7 receives a wobble input signal either directly from a recording medium (not shown) or from the pre-processing block 4, which performs e.g. a gain- and offset control, a pre-filtering, a sample-rate-conversion or the like.

In a first step the integral function of the input signal is calculated. This is done by the integrator 1, e.g. a simple accumulator adding all the input signal values. Since small offsets and non-ideal input signals may lead to a drift of the integral function, it is advantageous to reset the integral values from time to time, e.g. after one or more cycles. When resetting the integral at (e.g. positive) zero-crossings of the input signal, a proper reset value has to be found, since the integral value does not have a fixed value at this point. This is favorably avoided by integrating from one maximum (or minimum) to the next maximum (or minimum). This has the advantage that the integral value is always zero at a maximum (or minimum), independent of the current wobble period type. A further advantage is that the transition from one type of wobble to another type of wobble does always occur at the maximum. Therefore, the influence of transitions is minimized. A problem exists in that in MSK-Marks frequencies of 1.5 times the wobble frequency occur, i.e. an increased number of periods is found in the same time interval. This means that the three wobble periods of an MSK mark are detected as four wobble periods. Therefore, the theoretical values differ from this implementation. This, however, in general is no problem as the resulting characteristic integral maximum/minimum value allows a secure distinction from other wobble period types.

The maximum/minimum detector 2 finds maximum/minimum values in the integral function of the wobble signal in a wobble period. After one wobble period the maximum/minimum values are cleared, e.g. at zero-crossings of the integral function or at a maximum of the input wobble signal.

The multilevel detector 3 compares the obtained values with predefined values and outputs the wobble period type, i.e. f1(t) to f6(t). Of course, the invention is not limited to these exemplary functions. It is as well applicable to other frequency modulations. Exemplary maximum and minimum values corresponding to the different wobble period types are summarized in the following table. The amplitude values are multiplied with 100 and sampled at 66 MHz, which is intended to represent an 8-bit quantisation.

| wobble period type | maximum | minimum | order of max/min |
|---|---|---|---|
| f1 (t) | 1098 | −1098 | maximum/minimum |
| f2 (t) | 1098 | −1098 | minimum/maximum |
| f3 (t) | 730 | −730 | maximum/minimum |
| f4 (t) | 730 | −730 | minimum/maximum |
| f5 (t) | 961 | −1232 | maximum/minimum |
| f6 (t) | 1235 | −960 | maximum/minimum |

The values for f5(t) and f6(t) should be symmetric, i.e. the maximum for f5(t) and the minimum for f6(t) should have the same absolute value, as well as the minimum for f5(t) and the maximum for f6(t). Deviations result inter alia from quantisation errors. The above values are theoretical results. In practice the signal comprises noise components and the values are not reached exactly. Therefore, value ranges are advantageously defined, e.g. for the maximum of f1(t) values between 1030 and 1170 are considered valid. If the value ranges are wide a detection of unknown values is prevented, however, values might be incorrectly detected. If the value ranges are small, the detection is less likely to be incorrect, however, unknown values will produce errors. As mentioned before, in a preferred embodiment a value range without interruptions is used. An exception are the upper and lower positive and negative limits. In the above example, the smallest theoretical positive value is 730. Any positive value below 600, for example, can safely be regarded as an error. Similar rules apply for the other limits.

The types of wobble period f1(t), . . . f6(t) give information about the currently used modulation:
MSK (minimum shift keying)
MW (monotone wobble)
Sawtooth wobble representing a data '0' (HMW=harmonic modulated wave)
Sawtooth wobble representing a data '1' (HMW=harmonic modulated wave)
cannot detect (error)

With this information the type of the ADIP unit and the ADIP word structure are detected, e.g. by a statemachine 6, and the ADIP codeword is extracted. The statemachine 6 favorably is error tolerant. For example, MSK marks can only be found in specific locations in the data stream. If an MSK mark is detected at a false location, it should be ignored. If an expected MSK mark is missing, it should be added. Of course, if too many error occur, the statemachine 6 will eventually loose synchronization. In this case it has to wait for further synchronization marks in the data stream.

In order to provide a proper timing for the demodulator 7 the maxima in the input wobble are detected. The change from rising values to falling values is for example used for this purpose. If available timing information from a PLL locked to wobble can also be used.

What is claimed is:

1. A method for demodulating data of a wobble signal of an optical recording medium, wherein the wobble signal includes different types of wobble periods, the method comprising the steps of:
  transforming a frequency and phase of harmonic deviations within the wobble signal to amplitude deviations;
  detecting the amplitude deviations; and
  detecting a current type of wobble period from the detected amplitude deviations.

2. The method according to claim 1, further including the step of obtaining information about a currently used modulation from the detected type of wobble period.

3. The method according to claim 1, wherein the step of transforming the frequency and phase of harmonic deviations within the wobble signal to amplitude deviations includes integrating the wobble signal using a dynamic integrate function.

4. The method according to claim 3, further including the steps of:
  storing maximum and/or minimum values of an integral of the wobble signal within a wobble period; and
  using the stored maximum and/or minimum values as an indication of the type of wobble period.

5. The method according to claim 4, further including the step of determining an order of the maximum and minimum values for detecting the type of wobble period.

6. The method according to claim 4, further including the step of comparing the maximum and/or minimum values with value ranges for the different types of wobble periods.

7. The method according to claim 6, further including the step of determining an order of the maximum and minimum values for detecting the type of wobble period.

8. The method according to claim 1, further including the step of detecting at least one of the different types of wobble periods by measuring a frequency of the wobble signal.

9. The method according to claim 1, wherein the wobble signal is modulated using methods of minimum shift keying and harmonic modulated wave.

10. A device for demodulating data of a wobble signal of an optical recording medium, wherein the wobble signal includes different types of wobble periods, the device comprising:
- means for transforming a frequency and phase of harmonic deviations within the wobble signal to amplitude deviations;
- means for detecting the amplitude deviations; and
- means for detecting a current type of wobble period from the detected amplitude deviations.

11. An apparatus for reading from and/or writing to recording media, wherein the apparatus includes a device for demodulating data of a wobble signal of the recording media and the wobble signal includes different types of wobble periods, the apparatus comprising:
- means for transforming a frequency and phase of harmonic deviations within the wobble signal to amplitude deviations;
- means for detecting the amplitude deviations; and
- means for detecting a current type of wobble period from the detected amplitude deviations.

12. The method according to claim 1, wherein the data of the wobble signal being demodulated includes address-in-pregroove data.

13. The device according to claim 10, wherein the data of the wobble signal being demodulated includes address-in-pregroove data.

14. The device according to claim 10, wherein the means for transforming the frequency and phase of harmonic deviations within the wobble signal to amplitude deviations integrates the wobble signal using a dynamic integrate function.

15. The apparatus according to claim 11, wherein the data of the wobble signal being demodulated includes address-in-pregroove data.

16. The apparatus according to claim 11, wherein the means for transforming the frequency and phase of harmonic deviations within the wobble signal to amplitude deviations integrates the wobble signal using a dynamic integrate function.

* * * * *